US005516362A

United States Patent [19]

Gundjian et al.

[11] Patent Number: 5,516,362

[45] Date of Patent: May 14, 1996

[54] SECURITY MARKING METHOD AND COMPOSITION

[75] Inventors: Arshavir Gundjian, Montreal; Abraham Kuruvilla, Quebec, both of Canada

[73] Assignee: Nocopi Technologies, Inc., Wayne, Pa.

[21] Appl. No.: 462,736

[22] Filed: Jun. 5, 1995

Related U.S. Application Data

[63] Continuation-in-part of Ser. No. 406,766, Mar. 17, 1995, which is a continuation of Ser. No. 69,238, May 28, 1993, Pat. No. 5,421,869.

[51] Int. Cl.[6] .............................. C09D 11/00; B41M 3/14

[52] U.S. Cl. .......................... 106/22 B; 106/21 A; 427/7; 427/145; 427/157

[58] Field of Search ............................... 106/22 B, 21 A; 427/7, 145, 157

[56] References Cited

U.S. PATENT DOCUMENTS

| | | | |
|---|---|---|---|
| 3,886,083 | 5/1975 | Laxer | 106/21 A |
| 4,015,131 | 3/1977 | McDonough et al. | 106/21 A |
| 4,205,865 | 6/1980 | Lange et al. | 106/21 A |
| 4,610,806 | 9/1986 | Rosen | 106/21 A |
| 4,629,630 | 12/1986 | Devrient | 427/157 |
| 5,084,205 | 1/1992 | Auslander | 106/22 B |
| 5,091,006 | 2/1992 | Sarada et al. | 106/22 B |
| 5,114,478 | 5/1992 | Auslander et al. | 106/22 B |
| 5,135,569 | 8/1992 | Mathias | 106/22 B |
| 5,421,869 | 6/1995 | Gundjian et al. | 106/22 B |

*Primary Examiner*—Helene Klemanski
*Attorney, Agent, or Firm*—Sprung Horn Kramer & Woods

[57] ABSTRACT

A security marking method and composition wherein a first marking is applied to a surface of a substrate with a mixture of a printing medium and a first composition, wherein the first marking is visible to an unaided human eye and is indistinguishable from a marking applied with the printing medium alone, to an unaided human eye when illuminated by visible light or ultraviolet light. A second composition is added either with the mixture or thereafter, wherein the second composition is reactable with the first composition to fluoresce and wherein the fluorescing is only visible to an unaided human eye when illuminated by ultraviolet light.

8 Claims, 2 Drawing Sheets

SECURITY MARKING METHOD AND COMPOSITION

This application is a continuation-in-part application of U.S. application Ser. No. 08/406,766, filed Mar. 17, 1995, which is a continuation of U.S. application Ser. No. 08/069, 238, filed May 28, 1993 now U.S. Pat. No. 5,421,869.

BACKGROUND OF THE INVENTION

The present invention relates to a method and a composition for identifying diverse products that can be made of diverse materials, such as paper documents, appliances, clothing, boxes, glass products, plastic finish products and others in a covert manner.

It is, of course, well known that various means have been proposed in the past for covertly marking and identifying items. The previously used identifying methods often utilized essentially the so-called ultraviolet inks or paints that fluoresce when subjected to an ultraviolet light source. Such classical fluorescent markings used in conjunction with ultraviolet lights provide of course a dramatic effect, since the marking, which is originally seemingly invisible in visible or normal light, becomes brightly fluorescent and visible under ultraviolet radiation. However, the obvious fundamental drawback of such systems is that they are by their nature readily visible upon illumination by ultraviolet radiation and, therefore, can be easily located by any counterfeiter or product diverter. Consequently, such marks can be removed or they can be altered, since fluorescent dyes known as optical brighteners and inks are readily available today on the market.

SUMMARY OF THE INVENTION

The object of the present invention is to provide a dramatically effective solution to the above-mentioned problem by keeping the covert marking hidden both under regular (visible) light and under ultraviolet illumination. Thus, only the originator of the marking knows its location, and, therefore, to erase or modify such a covert mark by an uninformed intruder is practically impossible without destroying the entire substrate that carries the marking.

The present invention is based upon the use of a printing medium to which is added a reactive marking first composition. The printing medium, when applied to a substrate such as paper, cardboard, plastic and the like, is normally visible and appears both to the naked eye under normal or visible lighting conditions and when viewed under ultraviolet radiation, to display information markings just like a conventional printing medium without the reactive marking composition. This first composition is, however, reactive with a second composition in such a manner that upon interaction with the second composition, the marking on the substrate continues to remain the same as the markings produced by the printing medium alone and appear the same to the naked eye under normal lighting conditions, while on the other hand it becomes brilliant by fluorescence when subjected to any one of the commonly used sources of ultraviolet radiation.

Since this covert marking reveals itself only following both the activation process and the provision of ultraviolet illumination, the method of the present invention is a double security, fluorescence on demand, marking system.

Indeed the first and high level of security is provided by the indistinguishability between the covert marking and a conventional marking to the naked eye both under normal lighting and ultraviolet illumination conditions. The second level of security which plays the role of a double lock is provided by the fact that on demand the mark must be activated with a special marker containing the second composition and the covert marking still remains practically indistinguishable to the naked eye and reveals itself only in the form of a switched on fluorescence which shows only upon illumination by a commonly available ultraviolet radiation source.

It is significant that the present invention lends itself perfectly well to applications where the printing medium produces a common dark colored or even pitch black marking, since the fluorescent behavior renders even the dark colored marking completely modified and brightly visible by switched on fluorescence against any background and particularly a darker black background.

In accordance with the present invention, one embodiment of the method comprises the steps of applying a first marking to a substrate with a mixture of a printing medium and a first composition, wherein the first marking is visible to an unaided human eye and is indistinguishable, to an unaided human eye when illuminated by visible light or ultraviolet light, from a marking applied with the printing medium alone. The first marking is activated with a second composition, wherein the second composition is reactable with the first composition to fluoresce and wherein the fluorescing is only visible to an unaided human eye when illuminated by ultraviolet light.

The first marking may be all of the information printed on a substrate including a document, package, label, ticket, coupon or the like or it may be only selected information in certain areas of the substrate whereas the remaining information printed on the substrate is printed using the printing medium alone.

The printing medium can be printing inks such as offset ink, flexographic ink or any other common printing vehicle, toners used in laser printers, fax machines and copying machines and the printing inks used in different types of ink jet printers, etc.

The first composition is preferably selected from amino phthalides and quinazolines and in this instance, the second composition is preferably selected from novalac resins, bisphenols and hydroxybenzoates.

Alternatively, the first composition can be selected from the novalac resins, bisphenols and hydroxybenzoates, and the second composition can be selected from amino phthalides and quinazolines.

In one preferred embodiment, the printing medium includes a solvent selected from alcohol, acetone, methylethylketone or a combination thereof which provides a vehicle for the first composition.

In an alternative embodiment, where the printing medium is a toner, the first composition is integrated into the toner powder during the toner manufacturing process.

In a further embodiment, where the printing medium is either oil or water based, the first composition is in the form of dry micronized particles or micronized particles in suspension in the oil base or in an aqueous solution with a binder. In this instance, the second composition is applied in a solvent vehicle.

In another embodiment of the present invention, the method comprises the steps of applying a first marking to a substrate with a mixture of a printing medium, a first composition and a second composition both in the form of finely micronized particles. The first marking is visible to an unaided human eye and is indistinguishable, to an unaided human eye when illuminated by visible light or ultraviolet light, from a marking applied with the printing medium alone. The first and second compositions are reactable in response to a rubbing force applied to the first marking on the substrate to fluoresce and wherein the fluorescing is only visible to an unaided human eye when illuminated by ultraviolet light.

As in the previous embodiment, the marking can be all of the information applied or printed to a substrate such as a document or package, or it can be in selected areas with other information applied or printed using the printing medium alone.

In this embodiment, the first and second composition are mixed with the printing medium as micronized particles in a solution with a binder.

The present invention also relates to a security marking composition, which comprises the mixture of the printing medium and the first and second compositions as described above.

These and other features of the present invention will become more apparent from the detailed description of the present invention taken with the attached drawings, wherein:

DETAILED DESCRIPTION OF THE INVENTION

The present invention begins with the concept of applying, to a substrate surface, a marking using a printing medium and a first composition which is visible to an unaided eye and is indistinguishable, to an unaided eye when illuminated by visible light or ultraviolet light, from a marking applied with the printing medium alone.

Figure 1:
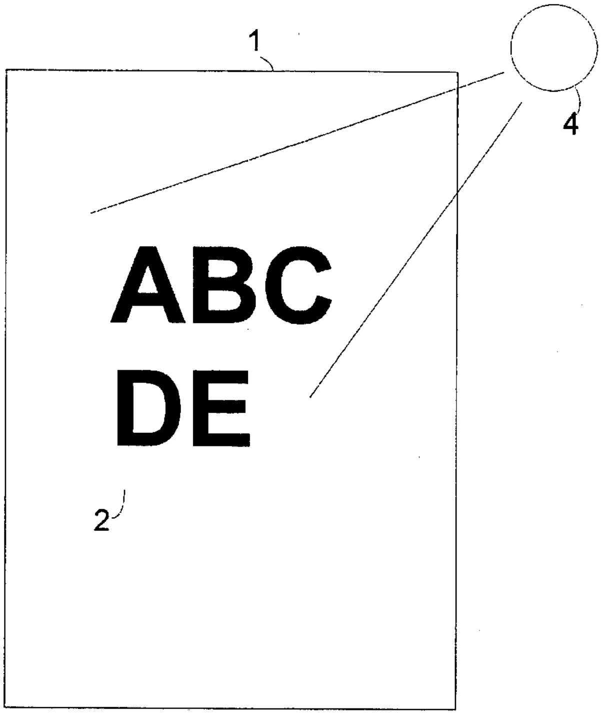
FIG. 1 is a schematic view of a first step of one method according to the present invention.

FIG. 1 shows a first step in a method wherein the marking 2 is applied to a substrate 1. The marking 2, including letters A–E, is visible under normal lighting conditions and when illuminated by an ultraviolet light source 4. In the marking 2 shown in FIG. 1, the letters A, B and C are printed by applying a mixture of a printing medium and a first composition, whereas the letters D and E are applied by use of the printing medium alone.

Thus all of the letters A–E of the marking 2 are indistinguishable from each other to an unaided human eye when illuminated by visible light or by the ultraviolet light 4.

The substrate 1 can be from a diverse range of materials including paper, cardboard, plastic, metals, fabric, glass, etc.

Figure 2:
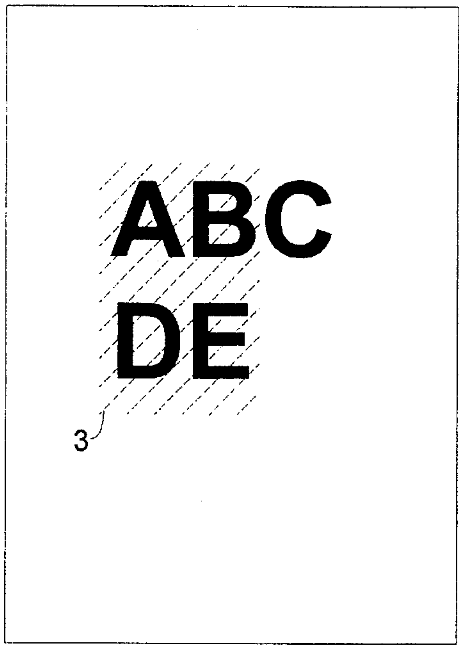
FIG. 2 is a schematic representation of a second step of one method according to the present invention.

In FIG. 2, the second composition is applied over the markings, specifically over letters A, B, D and E.

When the second composition is applied as shown in FIG. 2, it reacts with the first composition in letters A and B to fluoresce. However, the fluorescing on the substrate shown in FIG. 2, when viewed by a human eye and illuminated only by regular light, is not visible and thus letters A–E are indistinguishable from each other to an unaided human eye when illuminated by visible light.

Figure 3:
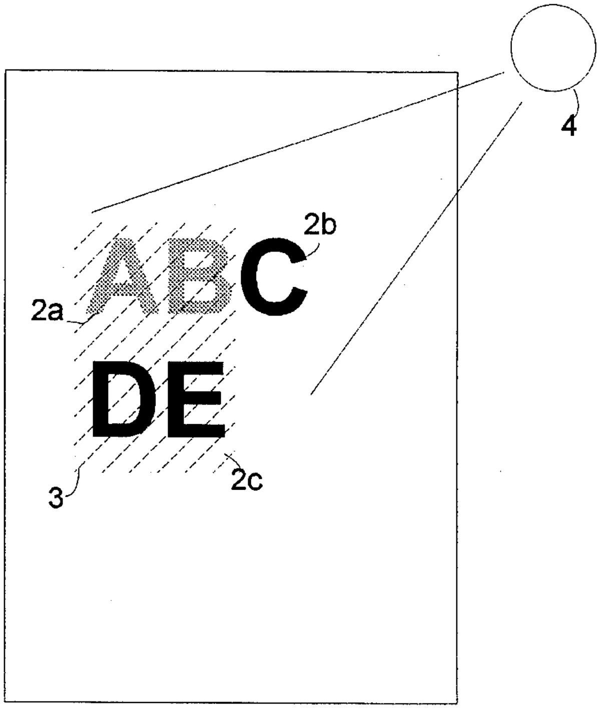
FIG. 3 is a schematic representation of a third step in accordance with one method of the present invention.

When, as shown in FIG. 3, the activated marking is illuminated by ultraviolet light 4, letters A and B (portion 2A of marking 2) will fluoresce, whereas the unactivated letter C (portion 2B) will not fluoresce and the letters D and E (portion 2C) will not fluoresce since they were applied using the printing medium alone.

Since the compositions according to the present invention exhibit a strong fluorescence emission in the visible spectrum when illuminated by an ultraviolet light source 4, such emissions which are relatively monochromatic and appear as a blue, yellow, red or orange color, will be visible even when the printing medium is dark or pitch black.

The reaction of the two compositions creates a new modified molecule which exhibits a pronounced fluorescence effect with respect to ultraviolet light in the range of 100 to 400 nanometer wavelengths. The new molecule, when not excited by the ultraviolet radiation from source 4, does not exhibit any appreciable absorption or emission in a visible spectrum and thus the letters A and B remain indistinguishable from letters C, D and E in FIG. 2 when illuminated by only visible light.

Figure 4:
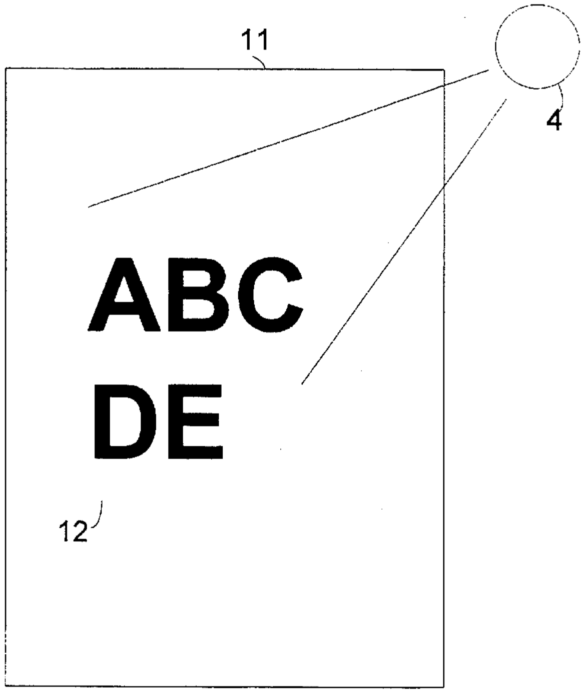
FIG. 4 is a schematic representation of a first step of another method according to the present invention.
Figure 5:
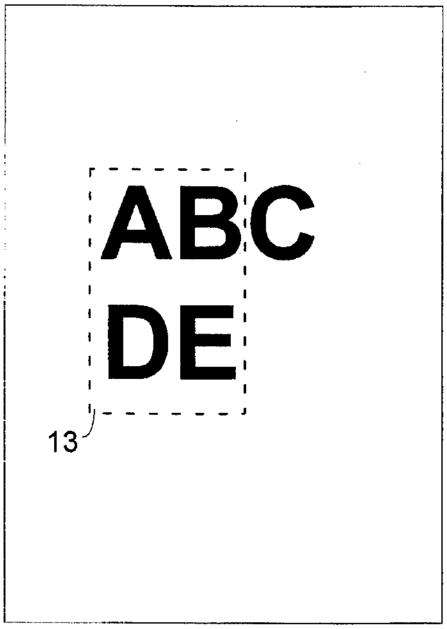
FIG. 5 is a schematic representation of a second step of another method according to the present invention.
Figure 6:
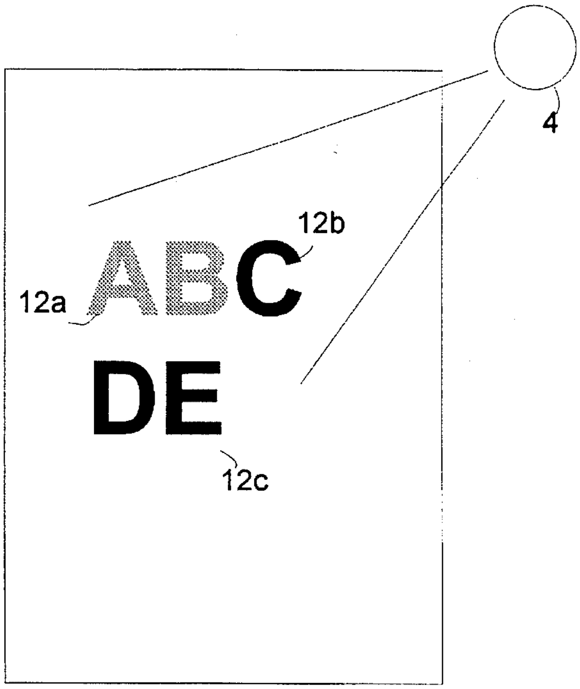
FIG. 6 is a schematic representation of a third step in accordance with said another method of the present invention.

In the method according to FIGS. 4–6, the marking 12 produced on substrate 11 includes letters A–C applied with a mixture of a printing medium, a first composition and a second composition, whereas the letters D and E are applied using the printing medium alone. Letters A–E are visible to a unaided human eye and letters A–C are indistinguishable, to an unaided human eye when illuminated by visible light or ultraviolet light 4, from the markings D and E applied with the printing medium alone. The first and second compositions are reactable in response to a rubbing force applied to the marking 12 on the substrate 11 to fluoresce and the fluorescing is only visible to an unaided human eye when illuminated by ultraviolet light.

Thus in FIG. 5, the area 13 demarcated by the broken lines has been subjected to a rubbing force by a human finger, the blunt end of a pen or other device. Although the first and second compositions contained in letters A and B have reacted to fluoresce, the fluorescing is not visible to an unaided human eye when only illuminated by visible light and thus all of the letters A–E appear to be indistinguishable from each other under those conditions.

However, as shown in FIG. 6, when illuminated by ultraviolet light from a source 4, letters A and B (portion 12A of marking 12) fluoresce, whereas letter C (portion 12B) does not because no mechanical force has been applied thereto and letters D and E (portion 12C) do not because they were applied using the printing medium alone.

In accordance with the present invention, it has been found that amino phthalides and quinazolines can be used as the first composition in printing mediums including solvents such as alcohol, acetone and methylethylketone or any combination thereof. In one embodiment, highly micronized particles of the first composition can be carried by a printing medium comprising an aqueous solution and be applied with a binder to a given surface or substrate. It has been found that materials such as novalac resins, bisphenols and hydroxybenzoates can be used as the second composition in solvent vehicles such as alcohol, acetone and methylethylketone or any combination thereof. In an alternative embodiment, the second composition can also be highly micronized and carried by an aqueous solution. When the first and second compositions are applied through a printing medium comprising a solvent, the two molecules react instantly and the mechanism described above makes the marking visible under ultraviolet radiation. When the first and second compositions include the micronized particles and are applied through an aqueous or an inert oil (non-solvent) printing medium, the activation will take place after highlighting the combination of the compositions with a solvent such as alcohol, acetone methylethylketone, etc. Activation in this case can also be achieved by heating the combination up to a temperature in the range of around 65° to 120° C. Activation can also be achieved in this latter case by a brisk rubbing action with one's fingernail or a blunt object such as the edge of the plastic casing of a highlighter.

The following are examples of compositions usable as the first and second compositions:

First Composition:

3,3-Bis (4-Dimethylaminophenyl)-6-dimethylaminophthalide (CVL)

(molecular formula $C_{26}H_{29}N_3O_2$)

3-(4-Dimethylaminophenyl)-3-[n,N-Bis(4-Octylphenyl )-amino] phthalide.

(molecular formula $C_{44}H_{56}N_2O_2$)

Second Composition:

Benzyl 4-Hydroxybenzoate (molecular formula $C_{14}H_{12}O_3$)

4,4-Isopropylidenediphenol Novalac resin-modified alkylphenol polymer (molecular formula $(CH_3)_2C(C_6H_4OH)_2$)

In an additional embodiment of the invention, the first marking is already a fluorescent marking before activation, i.e., in addition to the contents described above for the first composition the mixture includes a naturally fluorescing dye also known as an optical brightener. Referring to FIG. 1, all of the letters A–E will fluoresce when observed under the black light 4, and such fluorescence appears normally as a very light blue tinted white light fluorescence. After activation, the switched on fluorescence of letters A and B that results from the molecular modification of the ingredients contained in the first and second compositions, is a dramatically changed spectral characteristic. A differently colored fluorescence will be achieved which will appear as a distinctly yellow red or a deeper blue. Thus after activation identification can be made of the special nature of the original marking which originally exhibited a normal white fluorescence.

Examples of inks that are useful in accordance with the present invention are as follows:

1. A lithographic or offset ink having the following composition by weight:
   - 18% of SICPA D-2200-L-O ink base supplied by SICPA inks;
   - 22% of one of the compositions listed above as the second composition; and
   - 60% of a black, red or yellow offset ink such as Maga Laser ink supplied by Van Son Ink.
2. A lithographic ink that has the following composition by weight:
   - 65% Chromasoy Trans White supplied by Ron Ink Co.;
   - 5% Soya oil supplied by Keystone Printing Ink Co.;
   - 20% finely micronized $C_{14}H_{12}O_3$ (second composition); and
   - 10% finely micronized $C_{44}H_{56}N_2O_2$ (first composition).
3. A lithographic ink that has the following composition by weight:
   - 67% SICPA D-2200-L-O supplied by SICPA Inks;
   - 32.5% HRJ-10138 supplied by Schenectady Chemicals Inc.; and
   - 0.5% of an optical brightener pigment.

It will be understood by those persons skilled in this art that the present invention has been described hereinabove by way of example and by preferred embodiment and not as a limitation on the invention. It is to be realized that various changes, alterations, rearrangements and modifications can be made by those skilled in the art to which it relates without departing from the spirit and the scope of the present invention.

What is claimed is:

1. A security marking method comprising the steps of:

applying a first marking to a surface of a substrate with a mixture of a printing medium and a first composition, wherein the first marking is visible to an unaided human eye and is indistinguishable from a marking applied with the printing medium alone, to an unaided human eye when illuminated by visible light or ultraviolet light; and thereafter activating the first marking upon demand with a second composition, wherein the second composition is reactable with the first composition to fluoresce and wherein the fluorescing is only visible to an unaided human eye when illuminated by ultraviolet light.

2. The method according to claim 1, wherein the step of activating comprises applying the second composition with a marking pen.

3. The method according to claim 1, wherein the printing medium is a toner and the step of applying comprises printing the first marking with a laser printer or photocopier.

4. The method according to claim 1, wherein the first marking fluoresces in one color before activation and fluoresces in a different color after activation.

5. A security marking method comprising the steps of:

applying a first marking to a surface of a substrate with a mixture of a printing medium, a first composition and a second composition, wherein the first marking is visible to an unaided human eye and is indistinguishable from a marking applied with the printing medium alone, to an unaided human eye when illuminated by visible light or ultraviolet light, and wherein the first and second compositions are reactable in response to a mechanically applied rubbing action applied to the surface at the first marking on the substrate to fluoresce and wherein the fluorescing is only visible to an unaided human eye when illuminated by ultraviolet light; and thereafter mechanically applying a rubbing action to the first marking.

6. The method according to claim 5, wherein the printing medium is toner and the step of applying comprises printing the first marking with a laser printer or a photocopier.

7. The method according to claim 5, wherein the first marking fluoresces in one color before activation and fluoresces in a different color after activation.

8. A security marking composition comprising:

a mixture of a printing medium, a first composition and a second composition, wherein a marking on a substrate made by the mixture is visible to an unaided human eye and is indistinguishable from a marking made with the printing medium alone, to an unaided human eye when illuminated by visible light or ultraviolet light, and wherein the first and second compositions are reactable in response to a mechanically applied rubbing action to the marking on the substrate to fluoresce and wherein the fluorescing is only visible to an unaided human eye when illuminated by ultraviolet light.

* * * * *